(12) United States Patent
Kim

(10) Patent No.: US 8,541,125 B2
(45) Date of Patent: Sep. 24, 2013

(54) BATTERY PACK

(75) Inventor: Bongyoung Kim, Suwon-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 634 days.

(21) Appl. No.: 12/760,757

(22) Filed: Apr. 15, 2010

(65) Prior Publication Data

US 2011/0008650 A1 Jan. 13, 2011

(30) Foreign Application Priority Data

Jul. 9, 2009 (KR) ........................ 10-2009-0062734

(51) Int. Cl.
*H01M 2/10* (2006.01)

(52) U.S. Cl.
USPC ................................ 429/100; 429/96; 429/97

(58) Field of Classification Search
USPC .................................................. 429/96–100
See application file for complete search history.

(56) References Cited

U.S. PATENT DOCUMENTS

| 7,550,227 | B2 | 6/2009 | Yoon |
| 2004/0241541 | A1* | 12/2004 | Watanabe et al. ............. 429/163 |
| 2006/0210870 | A1 | 9/2006 | Moon et al. |
| 2006/0275664 | A1* | 12/2006 | Ohzuku et al. ................ 429/220 |
| 2009/0092896 | A1 | 4/2009 | Koh et al. |
| 2009/0130550 | A1 | 5/2009 | Kim |
| 2010/0159290 | A1 | 6/2010 | Kim et al. |

FOREIGN PATENT DOCUMENTS

| JP | 2006164601 | 6/2006 |
| KR | 1020060085875 A | 7/2006 |
| KR | 1020090026650 A | 3/2009 |
| KR | 1020090050179 A | 5/2009 |
| KR | 1020100072918 A | 7/2010 |

OTHER PUBLICATIONS

Korean Office Action issued by KIPO, dated Nov. 25, 2010, corresponding to Korean Patent Application No. 10-2009-0062734, together with Request for Entry.

* cited by examiner

*Primary Examiner* — Matthew Merkling
(74) *Attorney, Agent, or Firm* — Robert E. Bushnell, Esq.

(57) ABSTRACT

A battery pack that prevents a circuit module from being bent and improves durability against an external impact. The battery pack includes a bare cell on which an electrode terminal protrudes from a surface thereof, a circuit module disposed on the surface of the bare cell, a first lead plate coupled to a side of the circuit module, the first lead plate being connected to the surface of the bare cell, and a first holder disposed between the circuit module and the surface of the bare cell, the first holder being coupled to the first lead plate.

13 Claims, 7 Drawing Sheets ing lower ends of the pair of plates to each other. The first holder sidewall part may be disposed parallel to a long side

BATTERY PACK

CLAIM OF PRIORITY

This application makes reference to, incorporates the same herein, and claims all benefits accruing under 35 U.S.C. §119 from an application earlier filed in the Korean Intellectual Property Office on Jul. 9, 2009 and there duly assigned Serial No. 10-2009-0062734.

BACKGROUND OF THE INVENTION

1. Field of the Invention

A battery pack.

2. Description of the Related Art

Lithium ion secondary batteries may be manufactured in a battery pack configuration. A battery pack may include a bare cell, a circuit module, and an external cover. The bare cell may include an electrode assembly including a positive electrode plate, a negative electrode plate, and a separator, a can for receiving the electrode assembly, and a cap assembly that seals an upper end opening of the can. The circuit module may include a circuit device such as a charge/discharge device and a protective circuit device and be coupled to the bare cell. The external cover may cover the circuit module.

Generally, battery packs may deteriorate in quality due to external impacts. Thus, battery packs with structures that are durable against external impacts are required.

SUMMARY OF THE INVENTION

Embodiments are directed to a battery pack, which can prevent a circuit module from being bent and improve durability against external impacts.

At least one of the above and other features and advantages may be realized by providing a battery pack including: a bare cell on which an electrode terminal protrudes from a surface thereof; a circuit module disposed on the surface of the bare cell; a first lead plate coupled to a side of the circuit module, the first lead plate being connected to the surface of the bare cell; and a first holder disposed between the circuit module and the surface of the bare cell, the first holder being coupled to the first lead plate.

The first holder may be attached to the surface of the bare cell by an adhesive member.

The first holder may include: a first holder sidewall part comprising a pair of plates facing each other; a first holder connection part connecting one ends of the pair of plates to each other; and a first holder insertion hole in which the first lead plate is inserted, the first holder insertion hole being formed below the first holder connection part. The first holder may further include a first holder bottom part connecting lower ends of the pair of plates to each other. The first holder sidewall part may be disposed parallel to a long side direction of the surface of the bare cell, and the first holder bottom part may be disposed parallel to the surface of the bare cell.

The first holder may include: a first holder sidewall part comprising a pair of plates facing each other; a first holder connection part connecting middle regions of the pair of plates to each other; and a first holder insertion hole in which the first lead plate is inserted, the first holder insertion hole being formed below the first holder connection part. The first holder may further include a first holder bottom part connecting lower ends of the pair of plates to each other. The first holder sidewall part may be disposed parallel to a long side direction of the surface of the bare cell, and the first holder bottom part may be disposed parallel to the surface of the bare cell.

The first holder may be formed of an insulating material.

The first lead plate may include: a first lead bottom part contacting a side of a bottom surface of the circuit module; a first lead sidewall part bent and extending from the first lead bottom part; and a first lead extension part bent and extending from the first lead sidewall part to contact the surface of the bare cell, the first lead extension part being parallel to the first lead bottom part.

The first lead extension part may be inserted into the first holder insertion hole.

The first holder connection part and the first lead sidewall part may be disposed parallel to each other on the surface of the bare cell.

The first lead plate may be formed of a metallic material.

The battery pack may further include a second lead plate coupled to the other side of the circuit module, the second lead plate being connected to the surface of the bare cell. The second lead plate may be disposed and formed in a position and shape, which are symmetrical to those of the first lead plate with respect to the electrode terminal.

The battery pack may further include a second holder disposed between the circuit module and the surface of the bare cell, the second holder being coupled to the second lead plate. The second holder may have a shape symmetrical to that of the first holder with respect to the electrode terminal.

The battery pack may further include a top cover covering the circuit module.

At least one of the above and other features and advantages may be realized by providing a battery pack including: a bare cell on which an electrode terminal protrudes from a surface thereof; a circuit module disposed on the surface of the bare cell; and a first lead plate coupled to one side of the circuit module, the first lead plate being connected to the surface of the bare cell; a second lead plate coupled to the other side of the circuit module, the second lead plate being connected to the surface of the bare cell; and a holder disposed between the circuit module and the surface of the bare cell, the holder being coupled to the first lead plate and the second lead plate.

The holder may include: a holder sidewall part comprising a pair of plates facing each other; first and second holder connection parts connecting one ends and the other ends of the pair of plates to each other; and first and second holder insertion holes in which the first lead plate and the second lead plate are inserted, the first and second holder insertion holes being formed below the first and second holder connection parts.

The holder may further include first and second holder bottom parts connecting lower ends of the pair of plates to each other. The first and second holder bottom parts may be spaced from each other. The holder sidewall part may be disposed parallel to a long side direction of the surface of the bare cell, and the first and second holder bottom parts may be disposed parallel to the surface of the bare cell.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1A:
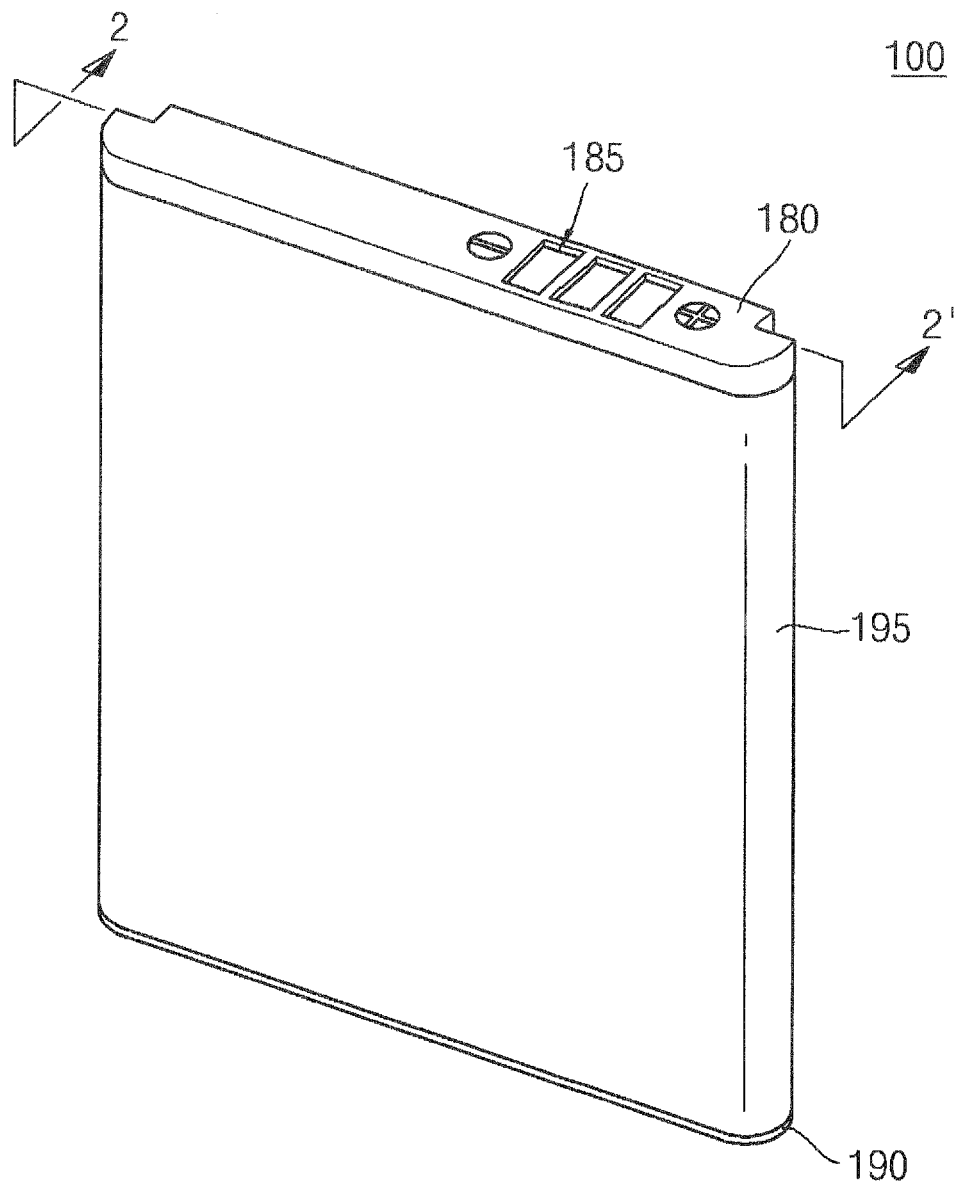
FIG. 1A illustrates a perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Figure 1B:
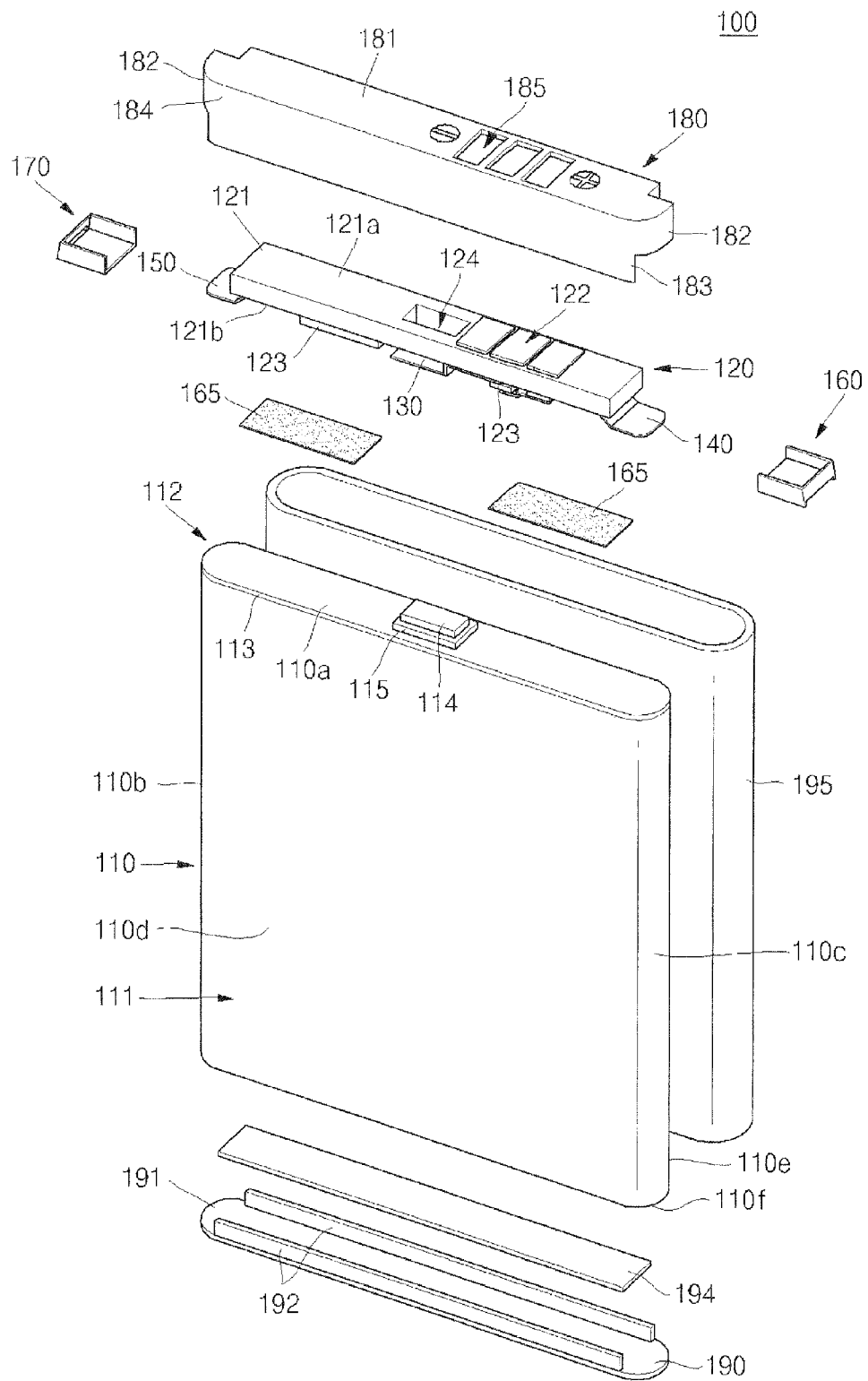
FIG. 1B illustrates an exploded perspective view of the battery pack of FIG. 1A.
Figure 1C:
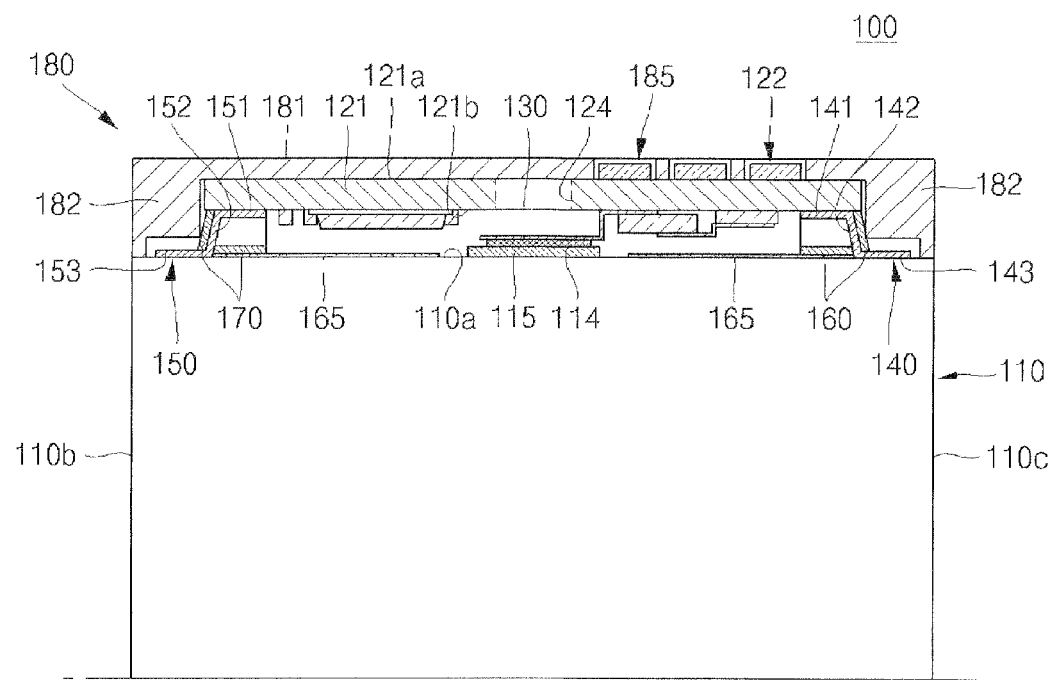
FIG. 1C illustrates a sectional view taken along line 2-2' of FIG. 1A before the battery pack is labeled.
Figure 2:
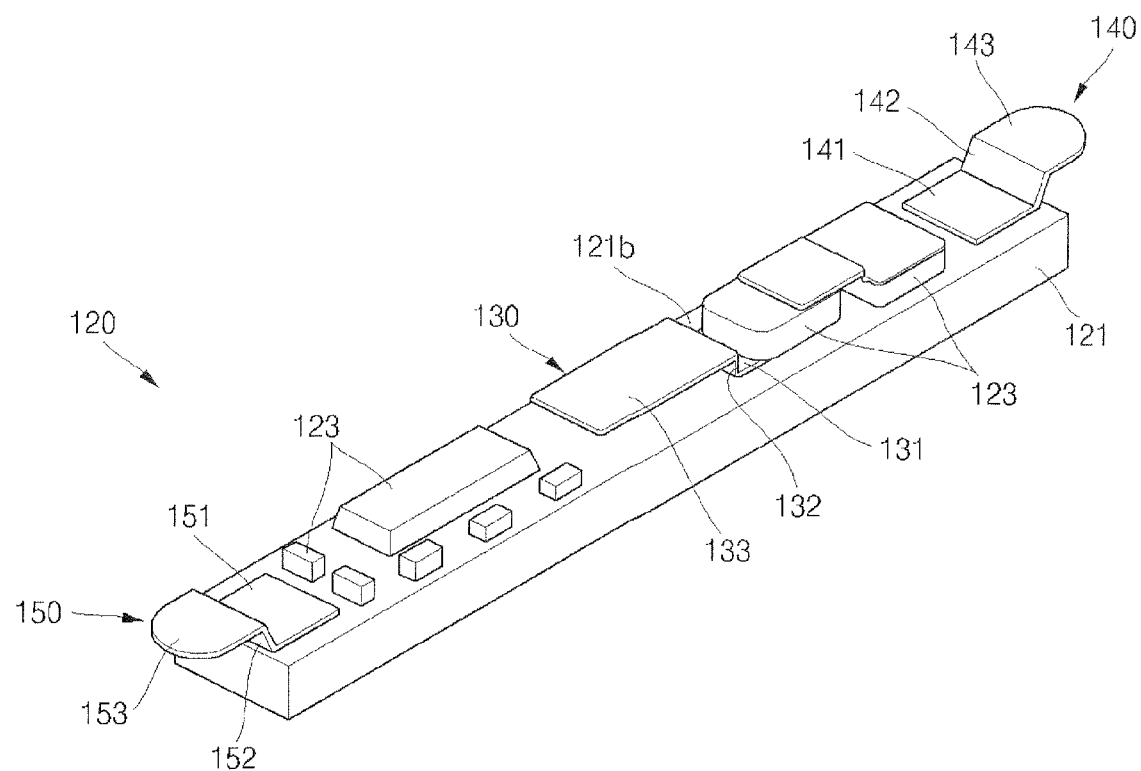
FIG. 2 illustrates a perspective view of a lower portion of the battery pack of FIG. 1B.

FIG. 1A illustrates a perspective view of a battery pack according to an embodiment, and FIG. 1B illustrates an exploded perspective view of the battery pack of FIG. 1A. FIG. 1C illustrates a sectional view taken along line 2-2' of FIG. 1A before the battery pack is labeled, and FIG. 2 illustrates a perspective view of a lower portion of the battery pack of FIG. 1B.

Referring to FIGS. 1A to 1C, a battery pack 100 according to an embodiment may include a bare cell 110, a circuit module 120, an electrode lead plate 130, a first lead plate 140, a second lead plate 150, a first holder 160, a second holder 170, a top cover 180, a bottom cover 190, and a label 195.

The bare cell 110 and the circuit module 120 may be electrically connected to each other through the electrode lead plate 130, the first lead plate 140, and the second lead plate 150 to form a core pack. The core pack may be coupled to the top cover 180 and the bottom cover 190 and labeled by the label 195 to complete the battery pack 100.

The bare cell 110 supplies an electric energy and may include an electrode assembly (not shown), a container-type can 111, and a cap assembly 112. The electrode assembly may include a positive electrode, a negative electrode, and a separator disposed between the positive electrode and the negative electrode. The can 111 may be formed of a metallic material and receive the electrode assembly and an electrolyte (not shown). The cap assembly 112 may seal an opening of the can 111. Here, the cap assembly 112 may include a cap plate 113 formed of a metallic material, an electrode terminal 114 protruding from the cap plate 113, and a gasket 115 disposed between the cap plate 113 and the electrode terminal 114 to electrically insulate the electrode terminal 114 from the cap plate 113.

The can 111 and the cap plate 113 themselves may serve as a positive terminal or a negative terminal. In this embodiment, the can 111 and the cap plate 113 serving as the positive terminal will be described. Thus, the electrode terminal 114 may serve as the negative terminal. Alternatively, the can 111, the cap plate 113, and the electrode terminal 114 may be changed in polarity.

Referring to FIG. 1B, the bare cell 110 may have a top surface 110a, a pair of short side surfaces 110b and 110c, a pair of long side surfaces 110d and 110e, and a bottom surface 110f. The electrode terminal 114 may protrude from the top surface 110a in a state where the electrode terminal 114 is insulated from the top surface 110a by the gasket 115. The pair of short side surfaces 110b and 110c and the pair of long side surfaces 110d and 110e are connected to the top surface 110a. The bottom surface 110f is connected to the side surfaces 110b, 110c, 110d, and 110e and faces the top surface 110a. Here, the pair of short side surfaces 110b and 110c designates surfaces having a relatively narrow width among the side surfaces 110b, 110c, 110d, and 110e connected to the top surface 110a of the bare cell 110. The pair of long side surfaces 110d and 110e designates surfaces having a relatively wide width among the side surfaces 110b, 110c, 110d, and 110e of the bare cell 110.

The circuit module 120 is disposed on an upper portion of the bare cell 110 and electrically connected to the bare cell 110. The circuit module 120 may include a circuit board 121, an external terminal 122, and a hole 124 for welding.

The circuit board 121 may include a plate formed of a resin. The circuit board 121 may include a circuit (not shown) for controlling charging and discharging of the bare cell 110 or a protective circuit (not shown) such as a circuit for preventing the bare cell 110 from being overdischarged and overcharged. The circuit board 121 may include a circuit device 123 configured to realize a charge/discharge circuit (not shown) and the protective circuit (not shown) on a bottom surface 121b of the circuit board 121. In this embodiment, a top surface 121a of the circuit board 121 may be equal to that of the circuit module 120, and the bottom surface 121b of the circuit board 121 may be equal to that of the circuit module 120.

The external terminal 122 is disposed on the top surface 121a of the circuit board 121 to electrically connect the circuit board 121 to an external electric device (not shown).

The hole 124 for welding passes through the top surface 121a and the bottom surface 121b of the circuit board 121. The hole 124 for welding is defined in a region corresponding to the electrode terminal 114 of the bare cell 110 to provide a welding space when the electrode lead plate 130 is welded to the electrode terminal 114 of the bare cell 110 by resistance welding.

The electrode lead plate 130 is disposed on the bottom surface 121b of the circuit board 121 and electrically connected to a negative interconnection pattern (not shown) of the circuit module 120. Also, the electrode lead plate 130 is electrically connected to the electrode terminal 114 by resistance welding through the hole 124 for welding. The electrode lead plate 130 may be formed of a metallic material, e.g., nickel or nickel alloy. Here, the electrode lead plate 130 may be electrically connected to the electrode terminal 114 to serve as a negative electrode, like the electrode terminal 114.

Specifically, referring to FIG. 2, the electrode lead plate 130 may include an electrode lead bottom part 131, an electrode lead sidewall part 132, and an electrode lead extension part 133.

The electrode lead bottom part 131 contacts a peripheral surface of the hole 124 for welding of the bottom surface 121b of the circuit board 121 and may be electrically connected to the circuit device 123 (e.g., a positive temperature coefficient (PTC) device) disposed around the hole 124 for welding.

The electrode lead sidewall part 132 is bent from the electrode lead bottom part 131 to extend toward the bare cell 110.

The electrode lead extension part 133 is bent and extends from the electrode lead sidewall part 132 to contact the electrode terminal 114. Thus, the electrode lead extension part 133 is parallel to the electrode lead bottom part 131. The electrode lead extension part 133 is disposed at a position corresponding to the hole 124 for welding and substantially welded to the electrode terminal 114 by resistance welding through the hole 124 for welding.

The first lead plate 140 is coupled to one side of the circuit module 120 and electrically connected to a positive interconnection pattern (not shown) of the circuit module 120. Also, the first lead plate 140 extends such that it is connected to the top surface 110a of the bare cell 110 to electrically connect the bare cell 110 to the circuit module 120. The first lead plate 140 may be formed of a metallic material, e.g., nickel or nickel alloy. Here, the first lead plate 140 is connected to the top surface 110a (i.e., it constitutes the cap plate 113) of the bare cell 110 to serve as a positive electrode.

Specifically, referring to FIG. 2, the first lead plate 140 may include a first lead bottom part 141, a first lead sidewall part 142, and a first lead extension part 143.

The first lead bottom part 141 has a plate shape to contact a side of the bottom surface 121b of the circuit board 121 and is electrically connected to the circuit module 120 by laser welding.

The first lead sidewall part 142 is bent from the first lead bottom part 141 and extends toward the top surface 110a of the bare cell 110 to secure a distance between the circuit module 120 and the bare cell 110.

The first lead extension part 143 is bent and extends from the first lead sidewall part 142 to contact the top surface 110a of the bare cell 110. Thus, the first lead extension part 143 is parallel to the first lead bottom part 141. The first lead extension part 143 is electrically connected to the top surface of the bare cell 110 by laser welding.

The second lead plate 150 is coupled to the other side of the circuit module 120 such that it is symmetrical with respect to the first lead plate 140 and electrically connected to the positive interconnection pattern (not shown) of the circuit module 120. Also, the second lead plate 150 extends such that it is connected to the top surface 110a of the bare cell 110 to electrically connect the bare cell 110 to the circuit module 120. The second lead plate 150 may have the same configuration and size as the first lead plate 140 and be formed of the same material as the first lead plate 140. The second lead plate 150 may include a second lead bottom part 151, a second lead sidewall part 152, and a second lead extension part 153. Referring to FIG. 2, the second lead bottom part 151, the second lead sidewall part 152, and the second lead extension part 153 of the second lead plate 150 correspond to the first lead bottom part 141, the first lead sidewall part 142, and the first lead extension part 143 of the first lead plate 140, respectively. Thus, detailed descriptions with respect to the second lead plate 150 will be omitted.

The second lead plate 150 including the above-described components is disposed on the upper portion of the bare cell 110 together with the first lead plate 140 to maintain the circuit module 120 in a horizontal state. Accordingly, in the case where the first lead plate is disposed on only one side of an existing circuit module, the second lead plate 150 may prevent the quality of the battery from deteriorating due to the bending of the circuit module generated when the first lead plate is welded to the top surface of the bare cell by laser welding.

The first holder 160 is formed in the form of that first lead plate 140 is inserted into the first holder 160. The first holder 160 is attached to the top surface 110a of the bare cell 110 using an adhesive member 165, e.g., a double-sided adhesive tape. Thus, the first holder 160 is disposed between the circuit module 120 and the top surface 110a of the bare cell 110. The first holder 160 may support the circuit module 120 to prevent the circuit module 120 from being bent by an external impact. Therefore, the battery pack 100 may have durability against external impacts. Also, the first holder 160 pushes the first lead plate 140 toward the top surface 110a of the bare cell 100 to fix the first lead plate 140. Thus, the first lead plate 140 may closely adhere to the top surface 110a of the bare cell 100. Therefore, welding efficiency may be improved by the first holder 160 when the first lead plate 140 is welded to the top surface 110a of the bare cell 100. In addition, the first holder 160 may protect the first lead plate 140 to soften the impacts transmitted to the welded portion disposed between the first lead plate 140 and the top surface 110a of the bare cell 110 when an external force is applied to the battery pack 100. Here, the first holder 160 may be formed of an insulating material to prevent the bare cell 110 and the circuit module 120 from unnecessarily short-circuiting with each other.

The second holder 170 is formed in the form of that second lead plate 150 is inserted into the second holder 170. The second holder 170 is attached to the top surface 110a of the bare cell 110 using an adhesive member 165, e.g., a double-sided adhesive tape. Thus, the second holder 170 is disposed between the circuit module 120 and the top surface 110a of the bare cell 110. The second holder 170 may support the circuit module 120 together with the first holder 160 to prevent the circuit module 120 from being bent by an external impact. Therefore, the battery pack 100 may have durability against external impacts. Also, the second holder 170 fixes the second lead plate 150 to the top surface 110a of the bare cell 110. Thus, the second lead plate 150 may closely adhere to the top surface 110a of the bare cell 100. Therefore, welding efficiency may be improved by the second holder 170 when the second lead plate 150 is welded to the top surface 110a of the bare cell 100. In addition, the second holder 170 may protect the second lead plate 150 to soften the impacts transmitted to the welded portion disposed between the second lead plate 150 and the top surface 110a of the bare cell 110 when external force is applied to the battery pack 100. Here, the second holder 170 may be formed of an insulating material to prevent the bare cell 110 and the circuit module 120 from unnecessarily short-circuiting with each other.

The top cover 180 is coupled to the upper portion of the bare cell 110 and receives the circuit module 120 in an inner space thereof. The top cover 180 may include a cover plate 181 and a sidewall 184 extending from the cover plate 181 toward the circuit module 120.

The cover plate 181 may have a shape approximately similar to that of the top surface 110a of the bare cell 110. An inner surface of the cover plate 181 faces and contacts the top surface 121a of the circuit board 121. A through hole 185 is formed in a region of the cover plate 181 corresponding to the external terminal 122. The external terminal 122 may be exposed through the through hole 185 to the outside to electrically connect the battery pack 100 to an external electric device (not shown).

The sidewall 184 includes two ends 182 disposed on both ends of the top cover 180 in a longitudinal direction and a connection part 183 connecting the both ends 182 to each other. The two ends 182 contact regions corresponding to the short side surfaces 110b and 110c of the top surface 110a of the bare cell 110 to support the top cover 180. The connection part 183 may further extend toward the circuit module 120 than both the ends 182. Portions of the connection part 183 covering upper portions of the pair of long side surfaces 110d and 110e of the bare cell 110 are surrounded by the label 195.

The bottom cover 190 is coupled to a lower portion of the bare cell 110. The bottom cover 190 may include a bottom plate 191 and extension parts 192 extending from the bottom plate 191 toward the bare cell 110.

The bottom plate 191 may have a shape approximately equal to that of the bottom surface 110f of the bare cell 110 and may adhere to the bottom surface 110f of the bare cell 110 by an adhesive member 194.

The extension parts 192 cover lower portions of the long side surfaces 110d and 110e of the bare cell 110. The extension parts 192 are surrounded by the label 195.

The label 195 is surroundingly attached to the side surfaces 110b, 110c, 110d, and 110e of the bare cell 110. The label 195 covers a portion of the connection part 183 of the top cover 180 and the extension parts 192 of the bottom cover 190.

A configuration of the first holder 160 and a connection relation between the first holder 160 and the first lead plate 140 will be described in detail. Here, since a configuration of the second holder 160 and a connection relation between the second holder 170 and the second lead plate 150 are corresponding to that of first holder 160 and that between the first holder 160 and the first lead plate 140, their explanations will be omitted.

Figure 3:
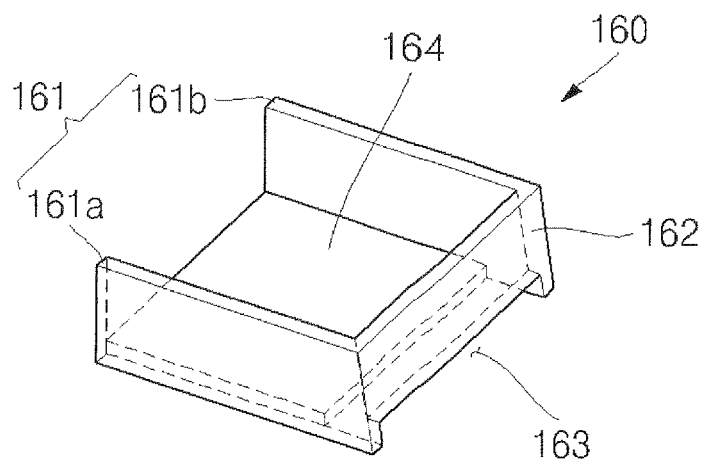
FIG. 3 illustrates an enlarged perspective view of a first holder of the battery pack of FIG. 1B.
Figure 4:
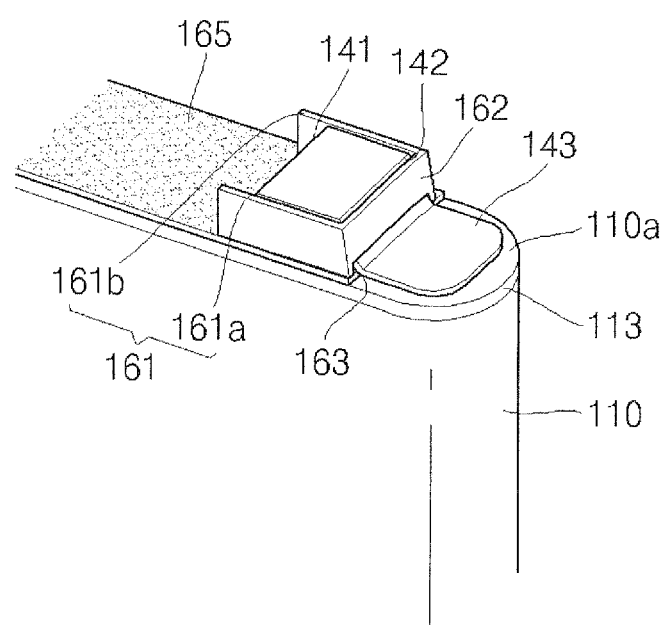
FIG. 4 illustrates a partially perspective view of a connection relation between a first lead plate and a first holder in the battery pack of FIG. 1C.

FIG. 3 illustrates an enlarged perspective view of a first holder of the battery pack of FIG. 1B, and FIG. 4 illustrates a partially perspective view of a connection relation between a first lead plate and a first holder in the battery pack of FIG. 1C. In FIG. 4, for better understanding, a configuration of the circuit module 120 coupled to the first lead plate 140 will be omitted.

Referring to FIGS. 3 and 4, a first holder 160 may include a first holder sidewall part 161, a first holder connection part 162, and a first holder insertion hole 163. The first holder 160 may further include a first holder bottom part 164.

The first holder sidewall part 161 is disposed parallel to a long side direction of the top surface 110a of the bare cell 110. The first holder sidewall part 161 may include a pair of plates 161a and 161b facing each other in a state where they stand with respect to a side of the top surface 110a of the bare cell 110. Here, each of the pair of plates 161a and 161b may have a trapezoid shape. The first holder sidewall part 161 may receive the first lead bottom part 141 and the first lead sidewall part 142 of the first lead plate 140 to serve as a main part for fixing the first lead plate 140.

The first holder connection part 162 is connected to one ends of the pair of plates 161a and 161b in a state where it stands on a side of the top surface 110a of the bare cell 110. The first holder connection part 162 may be disposed parallel to the first lead sidewall part 142 of the first lead plate 140 on the top surface 110a of the bare cell 100 to closely adhere to the first lead sidewall part 142, thereby protecting the first lead sidewall part 142 of the first lead plate 140 against external impacts.

The first holder insertion part 163 is formed below the first holder connection part 162. Thus, the first lead extension part 143 of the first lead plate 140 may be inserted into and coupled to the first holder 160. Also, the first holder insertion hole 163 allows the first lead extension part 143 to pass through the first holder connection part 162 to contact and weld on the top surface 110a of the bare cell 110 by a laser welding.

The first holder bottom part 164 is connected to lower ends of the pair of plates 161a and 161b such that it is attached to the top surface 110a of the bare cell 110. The first holder bottom part 164 is disposed parallel to the top surface 110a of the bare cell 110. Here, the first holder bottom part 164 is not disposed at portions corresponding to the first holder connection part 162 and the first holder insertion hole 163 such that the first lead extension part 143 of the first lead plate 140 passes through the first holder insertion hole 163 to easily contact the top surface 110a of the bare cell 110.

As described above, the battery pack 100 according to an embodiment may include the first holder 160 and the second holder 170 which are insertedly coupled to the first lead plate 140 and the second lead plate 150, respectively, and disposed between the top surface 110a of the bare cell 110 and the circuit module 120. As a result, it may prevent the circuit module from being bent, and durability against external impacts may be improved. Therefore, the quality of the battery pack 100 according to an embodiment may be improved.

Also, the battery pack 100 according to an embodiment is welded in a state where the first lead plate 140 and the second lead plate 150 are pushed down and fixed to the top surface 110a of the bare cell 110 using the first holder 160 and the second holder 170. Thus, welding efficiency of the first lead plate 140 and the second lead plate 150 may be improved.

In addition, in the battery pack 100 according to an embodiment, the first holder 160 and the second holder 170 may protect the first lead plate 140 and the second lead plate 150 to soften the impacts transmitted to the welded portion disposed between each of the first lead plate 140 and the second lead plate 150 and the top surface 110a of the bare cell 110.

A battery pack according to another embodiment will be described below.

The battery pack according to another embodiment has the same configuration and operation as those the battery pack 100 according to an embodiment except for a configuration of a first holder 260. Thus, in the battery pack according to another embodiment, a configuration of the first holder 260 and a connection relation between the first holder 260 and a first lead plate 140 will be preponderantly described.

Figure 5:
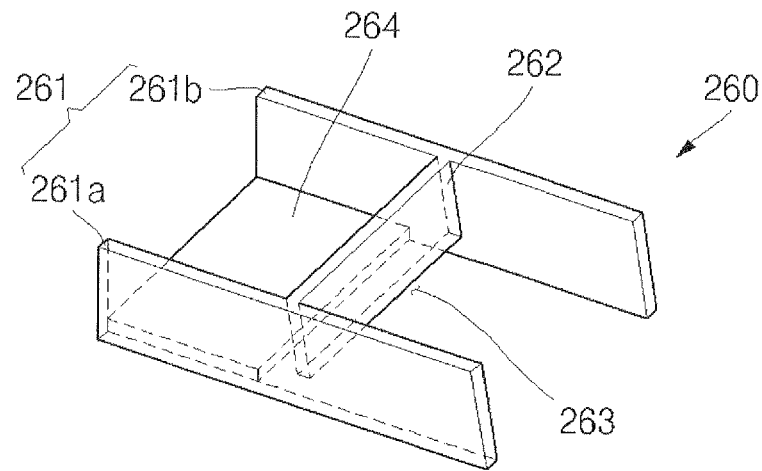
FIG. 5 illustrates an enlarged perspective view of a first holder of a battery pack according to another embodiment.
Figure 6:
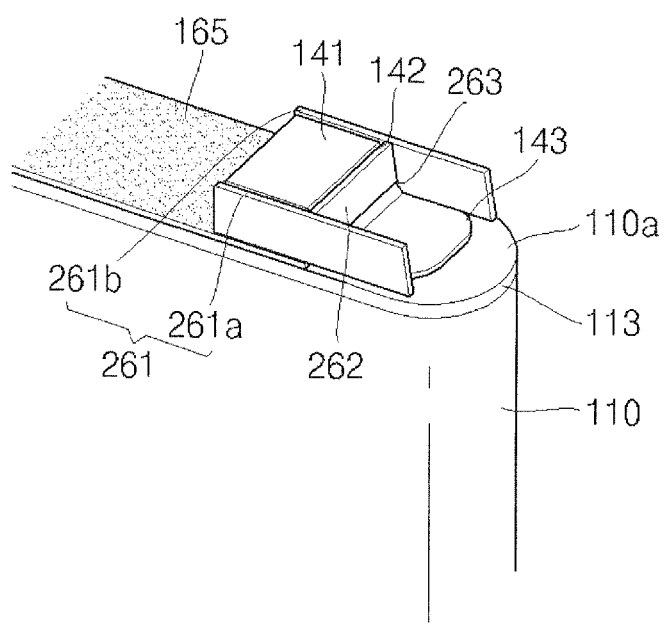
FIG. 6 illustrates a partially perspective view of a connection relation between a first lead plate and the first holder in the battery pack according to another embodiment.

FIG. 5 illustrates an enlarged perspective view of a first holder of a battery pack according to another embodiment, and FIG. 6 illustrates a partially perspective view of a connection relation between a first lead plate and the first holder in the battery pack according to another embodiment.

Referring to FIGS. 5 and 6, a first holder 260 may include a first holder sidewall part 261, a first holder connection part 262, and a first holder insertion hole 263. The first holder 260 may further include a first holder bottom part 264.

The first holder sidewall part 261 is disposed parallel to a long side direction of a top surface 110*a* of a bare cell 110. The first holder sidewall part 261 may include a pair of plates 261*a* and 261*b* facing each other in a state where they stand with respect to a side of the top surface 110*a* of the bare cell 110. Since the first holder sidewall part 261 has the same operation as the first holder sidewall 161 of FIG. 3, duplicated descriptions will be omitted.

The first holder connection part 262 is connected to middle regions of the pair of plate 261*a* and 261*b* in a state where it stands on a side of a top surface 110*a* of a bare cell 110. The first holder connection part 262 may be disposed parallel to the first lead sidewall part 142 of the first lead plate 140 on the top surface 110*a* of the bare cell 100 to closely adhere to the first lead sidewall part 142, thereby protecting the first lead sidewall part 142 of the first lead plate 140 against external impacts. Here, since the first holder connection part 262 is connected to the middle regions of the pair of plate 261*a* and 261*b*, the first lead extension part 143 of the first lead plate 140 may be surrounded and protected by the first holder sidewall part 161.

Since the first holder insertion part 263 has the same configuration and operation as those of the first holder insertion hole 163, duplicated descriptions will be omitted.

The first holder bottom part 264 is connected to lower ends of the pair of plates 161*a* and 161*b* such that it is attached to the top surface 110*a* of the bare cell 110. The first holder bottom part 264 is disposed parallel to the top surface 110*a* of the bare cell 110. Here, the first holder bottom part 264 is not disposed at portions corresponding to the first holder connection part 262 and the first holder insertion hole 263 such that the first lead extension part 143 of the first lead plate 140 passes through the first holder insertion hole 263 to easily contact the top surface 110*a* of the bare cell 110.

A second holder (not shown) is disposed on the other side of the top surface 110*a* of the bare cell 110 to fix a second lead plate 150 and support the circuit module (refer to reference numeral 120 of FIG. 1B) together with the first holder 260. The second holder (not shown) is disposed and formed in a position and shape, which are substantially symmetrical to those of the first holder 260 with respect to an electrode terminal 114, like that the second holder 170 is disposed and formed in a position and shape, which are substantially symmetrical to those of the first holder 160 with respect to an electrode terminal 114, their descriptions will be omitted.

As described above, in the battery pack according to another embodiment, since the first holder connection part 262 of the first holder 260 is connected to the middle regions of the pair of plates 261*a* and 261*b*, the first lead bottom part 141 of the first lead plate 140 coupled to the first holder 260 as well as the first lead extension part 143 may be surroundingly protected. Thus, in the battery pack according to another embodiment, since the first lead plate 140 is welded in a state where it is more firmly fixed to the top surface 110*a* of the bare cell 110, the welding efficiency may be improved.

In addition, when external force is applied to the battery pack according to another embodiment, the impacts transmitted to the welded portion disposed between the first lead plate 140 and the top surface 110*a* of the bare cell 110 may be effectively softened.

A battery pack according to another embodiment will be described below.

The battery pack according to another embodiment has the same configuration and operation as those the battery pack 100 according to an embodiment, except for a configuration of a holder 360 in which the first lead plate 140 and the second lead plate 150 of FIG. 1C are inserted. Thus, in the battery pack according to another embodiment, a configuration of the holder 360 will be preponderantly described.

Figure 7:
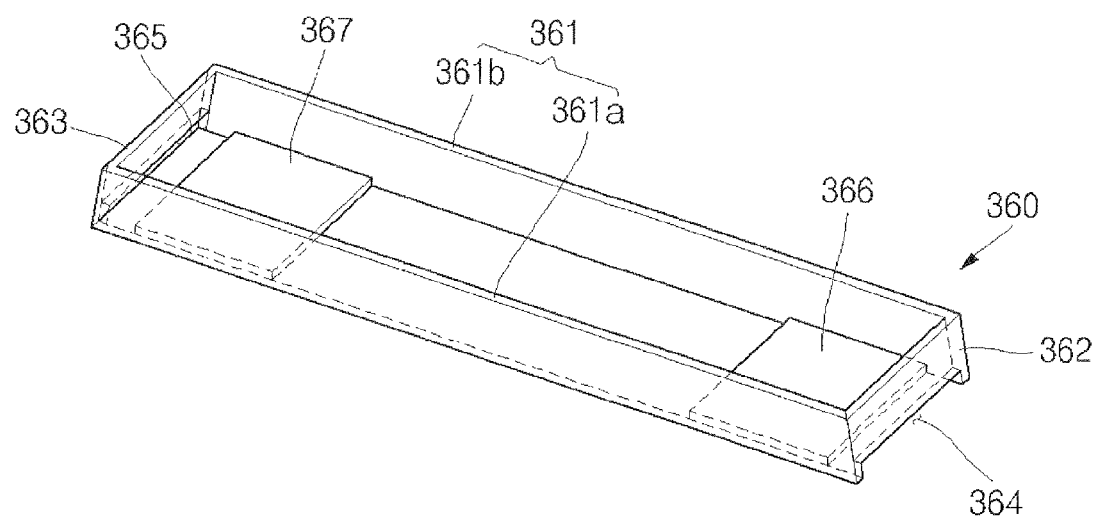
FIG. 7 illustrates an enlarged perspective view of a holder of a battery pack according to another embodiment.

Referring to FIG. 7, holder 360 is formed in the form of that the first lead plate 140 and the second lead plate 150 of FIG. 1C are inserted into the holder 360. The holder 360 is attached to a top surface 110*a* of a bare cell 110 using an adhesive member 165, e.g., a double-sided adhesive tape. Thus, the holder 360 is disposed between a circuit module 120 and the top surface 110*a* of the bare cell 110. The first holder 160 and the second holder 170 of FIG. 1C are integrally formed with each other to form the holder 360.

Specifically, the holder 360 may include a holder sidewall part 361, first and second holder connection parts 362 and 363, first and second holder insertion holes 364 and 365, and first and second holder bottom parts 366 and 367.

The first holder sidewall part 361 is disposed parallel to a long side direction of the top surface 110*a* of the bare cell 110 of FIG. 1C. The first holder sidewall part 361 may include a pair of plates 361*a* and 361*b* facing each other in a state where they stand with respect to the top surface 110*a* of the bare cell 110. Here, each of the pair of plates 361*a* and 361*b* may be longitudinally disposed along a long side direction of the top surface 110*a* of the bare cell 110 to allow the holder sidewall part 361 to more balancely and stably support the circuit module 120.

The first and second holder connection parts 362 and 363 connect one ends and the other ends of the pair of plates 361*a* and 361*b* to each other in a state where the first and second holder connection parts 362 and 363 stand on the top surface 110*a* of the bare cell 110 of FIG. 1C. Since the first holder connection part 362 has the same configuration and operation as those of the first holder connection part 162 of the first holder 160 of FIG. 3, duplicated descriptions will be omitted. Also, since the second holder connection part 363 is disposed and formed in a position and shape, which are substantially symmetrical to those of the first holder connection part 362, their descriptions will be omitted.

The first and second holder insertion holes 364 and 365 are formed below the first and second holder connection parts 362 and 363. The first lead extension part 143 of the first lead plate 140 and the second lead extension part 153 of the second lead plate 150 of FIG. 1C are insertedly coupled to the holder 360. Since the first holder insertion hole 364 has the same configuration and operation as those of the first holder insertion hole 163 of the first holder 160 of FIG. 3, duplicated descriptions will be omitted. Also, since the second holder insertion part 365 is disposed and formed in a position and shape, which are substantially symmetrical to those of the first holder insertion part 364, their detailed descriptions will be omitted.

The first and second holder bottom parts 366 and 367 are connected to lower ends of the pair of plates 361*a* and 361*b* and attached to the top surface 110*a* of the bare cell 110 of FIG. 1C. Thus, the first and second holder bottom parts 366 and 367 are disposed parallel to the top surface 110*a* of the bare cell 110. Here, the first and second holder bottom parts 366 and 367 are not disposed at portions corresponding to the first holder connection part 362 and the first holder insertion part 364 and portions corresponding to the second holder connection part 363 and the second holder insertion part 365 such that the first lead extension part 143 of the first lead plate 140 and the second lead extension part 153 of the second lead plate 150 of FIG. 1C pass through the first holder insertion hole 364 and the second holder insertion hole 365 to easily contact the top surface 110*a* of the bare cell 110. Also, the first holder bottom part 366 is spaced from the second holder bottom part 367 to provide a welding space for welding the electrode terminal 114 and the electrode lead plate 130 of the bare cell 110 of FIG. 1C to each other.

As described above, the battery pack according to another embodiment may include the holder sidewall part 361 longitudinally disposed along a long side direction of the top surface 110*a* of the bare cell 110 to support more balancely and stably support the circuit module 120.

The battery pack according to the embodiments may include the holder, to which the lead plate is insertedly coupled, disposed between the surface of the bare cell and the circuit module to prevent the circuit module from being bent and improve durability against external impacts.

Also, since the battery pack according to the embodiments is welded in a state where the lead plate is pushed down and fixed to the surface of the bare cell using the holder, welding efficiency of the lead plate may be improved.

In addition, in the battery pack according to the embodiments, the holder may protect the lead plate to soften external impacts transmitted to the welded portion disposed between the lead plate and the surface of the bare cell.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery pack, comprising:
  a bare cell on which an electrode terminal protrudes from a surface of the bare cell;
  a circuit module disposed on the surface of the bare cell;
  a first lead plate coupled to a side of the circuit module, the first lead plate being connected to the surface of the bare cell; and
  a first holder disposed between the circuit module and the surface of the bare cell, the first holder being coupled to the first lead plate,
  wherein the first holder comprises:
    a first holder sidewall part comprising a pair of plates facing each other;
    a first holder connection part connecting one end of the pair of plates to each other;
    a first holder insertion hole in which the first lead plate is inserted, the first holder insertion hole being formed below the first holder connection part; and
    a first holder bottom part connecting lower ends of the pair of plates to each other,
  wherein the first lead plate is inserted into the first holder insertion hole and is extended outward of the first holder.

2. The battery pack as claimed in claim 1, wherein the first holder is attached to the surface of the bare cell by an adhesive member.

3. The battery pack as claimed in claim 1, wherein the first holder sidewall part is disposed parallel to a long side direction of the surface of the bare cell, and the first holder bottom part is disposed parallel to the surface of the bare cell.

4. The battery pack as claimed in claim 1, wherein the first holder is formed of an insulating material.

5. The battery pack as claimed in claim 1, wherein the first lead plate comprises:
  a first lead bottom part contacting a side of a bottom surface of the circuit module;
  a first lead sidewall part bent and extending from the first lead bottom part; and
  a first lead extension part bent and extending from the first lead sidewall part to contact the surface of the bare cell, the first lead extension part being parallel to the first lead bottom part.

6. The battery pack as claimed in claim 5, wherein the first lead extension part is inserted into the first holder insertion hole.

7. The battery pack as claimed in claim 5, wherein the first holder connection part and the first lead sidewall part are disposed parallel to each other on the surface of the bare cell.

8. The battery pack as claimed in claim 1, wherein the first lead plate is formed of a metallic material.

9. The battery pack as claimed in claim 1, further comprising a second lead plate coupled to the other side of the circuit module, the second lead plate being connected to the surface of the bare cell.

10. The battery pack as claimed in claim 9, wherein the second lead plate is disposed and formed in a position and shape which are symmetrical to those of the first lead plate with respect to the electrode terminal.

11. The battery pack as claimed in claim 9, further comprising a second holder disposed between the circuit module and the surface of the bare cell, the second holder being coupled to the second lead plate.

12. The battery pack as claimed in claim 11, wherein the second holder has a shape symmetrical to that of the first holder with respect to the electrode terminal.

13. The battery pack as claimed in claim 1, further comprising a top cover covering the circuit module.

* * * * *